A. R. FERGUSSON.
MEANS EMPLOYED IN MECHANICAL INDEXING.
APPLICATION FILED NOV. 29, 1915.

1,234,320. Patented July 24, 1917.

*Fig. 1.*

*Fig. 2.*

Witnesses:

Inventor
Alan R Fergusson
Wallace R Lane Attys.

UNITED STATES PATENT OFFICE.

ALAN ROBB FERGUSSON, OF CHICAGO, ILLINOIS.

MEANS EMPLOYED IN MECHANICAL INDEXING.

1,234,320. Specification of Letters Patent. Patented July 24, 1917.

Application filed November 29, 1915. Serial No. 63,996.

*To all whom it may concern:*

Be it known that I, ALAN ROBB FERGUSSON, a citizen of the United States, residing at Chicago, in the county of Cook and State of Illinois, have invented certain new and useful Improvements in Means Employed in Mechanical Indexing, of which the following is the specification.

This invention relates to a method of recording and indexing and is particularly applicable for making a permanent record of any name, which record comes with it and upon its face the means whereby it can be located or placed in a file instantly at any time thereafter. More particularly, the invention consists in first translating any name into a number, according to a predetermined plan; in then recording each resulting number upon a separate sheet or card and then numerically arranging said sheets or cards.

It is well known that in a great many different kinds of records, such as for correspondence, insurance policies, automobile licenses, tax records and telephone numbers, and a multitude of others, each policy or other record is assigned an arbitrary number, which number by itself is quite meaningless. According to my system the many different numbers assigned to each individual in the various records which may concern him are replaced by a single number, immediately ascertainable from his name, the number being the key to locating the person in any record in which he may appear.

I am well aware that codes or cipher systems have before been worked out, the dominating thought of which is to render a message unintelligible to those unfamiliar with the code; and that in some of these systems the various letters of the alphabet have been assigned different numbers. The purpose of such codes is, however, remote from that of indexing and recording, the main ideas are first unintelligibility to those not possessed of the key to the code; and second, easy translation back into ordinary language from the code by those possessed of the key.
In such code system, the code message is not intended to be a permanent record, it conveys no meaning in itself, its prime purpose would be destroyed if it did, the more confused and meaningless it appears, the better it serves as a temporary disguise for the message. My new system is completely distinguished from these code systems, first in that the translation into the number system is permanent, the number for all times taking the place of the name; second, in that the number in itself and by itself conveys all the information requisite to dealers of the name and to the key and guide and to all future dealers with an account on record; third, the number shows upon its face instantly, the place in the file and the like; and fourth, in that I dispense entirely with any concern over retranslation into letters, thereby making it possible to divide the alphabet into three parts, using a triple series of numbers, enormously simplifying the system and making it possible to use a single digit for each letter of the alphabet. My invention is thus fundamentally different in nature, function and manner of use from code systems of any kind.

It is the object of the invention in question to do away with the numerous delays incident to an alphabetic recording system, such as the continuous consultation of an index to locate page numbers in a ledger or record, and to classify entirely by number in such a way as to make any name immediately accessible without first consulting indexes or the like.

It is a further object of my invention to simplify by accurate filing, refiling and recording.

It is the further object of my invention to provide a system whereby every person has a special number which is permanently attached to him and is as immutable as his name, so that wherever the individual may be, the same number will follow and apply to him and he can always be identified in correspondence, by wire, etc., by this number. If my system is applied generally, this number will be the number of the individual's automobile license, insurance policy, his tax record, his telephone number, and a key to every other record in which his name may appear so that to the extent of the application of my new system, one single number will instantly serve to locate any record in any place concerning any individual.

Other objects and advantages of the invention in question will appear as of the description to follow proceeds.

In the drawings, Figure 1 represents a card produced in accord with the invention. Fig. 2 represents a loose leaf ledger sheet, produced according to the invention.

In the practice of my invention, I subdivide the alphabet into a plurality of series of numbers running from 1 to 9. The number ascribed to each letter of the alphabet is entirely arbitrary but for convenience of translation into the number system, I prefer to follow the standard keyboard of the typewriter and so number the keys of the typewriter successively, as represented here:

```
1 2 3 4 5 6 7 8 9 1
q w e r t y u i o p
  2 3 4 5 6 7 8 9 1
  a s d f g h j k l
   2 3 4 5 6 7 8 0
   z x c v b n m .
```

To translate therefore, any name into numbers, it will not be necessary to consult a table or chart but simply to write the name upon a specially equipped typewriter in which the corresponding numbers of the system are associated with the alphabet keys so as to print the numbers to correspond with the letters of the alphabet. The method of mechanical translation into the system makes it unnecessary to consult a chart table or the like even to put the name into numbers the first time.

It will not be generally necessary to use all the letters of the names but merely the first two or three and the last two or three letters of the name, more of each according to the number of names handled.

In a list of a hundred thousand names such as representing the clientile of a very large department store, or the policy holders (and policy numbers) of an insurance list, it will be sufficient to use five letters of each name, preferably the first three and the last two, translating these letters into the corresponding numbers. Thus, for instance, the name Montague, Albert K. would be represented as

```
M O N t a g U E   A l b e r t K.
8 9 7       7 3         2     9
```

The number permanently assigned to this name would be therefore, 89773, or in case of duplication, 89773—29, which represents the name and initials. The name Montgomery, Peter R., would translate into 89746 or 89746—14, the initials being also translated in the event of duplication. The cards or sheets could then be assigned numerically.

A card and loose leaf ledger sheet inscribed with this name are shown in Figs. 1 and 2, respectively. The number at the top of the card and sheet, indicating at a glance its group number and position number. The initial number 14 may be placed below the main number, if desired, and make the position of the card and sheet still more easily ascertainable.

In actual practice of the invention where applied to five letters of a surname, as here illustrated, the resulting numbers are preferably divided, the first being selected to indicate a "group" or section number, the second to indicate a drawer or folio, and the last three to indicate the "position" number. Thus Montague, A. K. would be represented as 8—9—773—18, which would mean card No. 773, in drawer or folio 9, in section 8, each group being kept in a separate department in the case of cards and collected together in a book or loose leaf system, appropriate tabs in each case guiding the searcher to the correct group.

This method is of course, arbitrary and flexible. In small lists, the first letter alone might be sufficient to indicate the group, and the three following letters the position in the group, or the first and last three letters of the name respectively, the fifth letter being dispensed with, in which event, the name Montague would be written 8—673. In large systems seven or eight letters might be used in which event the first three might indicate the group and the remaining four or five the position in the group.

In very large lists, the subdivision is carried further and more letters used (such as the first and last three), thus the name Montague A. K. might be written 8—9—7—673—29, which would indicate the 8th section, 9th cabinet, 7th drawer, card No. 673—29 for a card system; or case 8, shelf 9, vol. 7, page 673—29 for a loose leaf system.

In the event of duplication of numbers, including initial numbers, as may occur in systems having very large numbers, cards of different colors are used to distinguish the names. Thus, persons of the name of Richardson, J. R., each would be translated into figures as 48497 (in a five letter system) or 48497—84. A glance, however, at the filing cabinet or book would instantly reveal the duplication, in which event a different color card would be used for one of the persons and the presence of two colors at this point in the file would instantly indicate a duplication to all subsequent inspection of the file and put them upon their guard to consult the right card of the two. Duplications of this kind are very rare in lists of a hundred thousand names or less.

It is of course possible that in handling a large number of names, some thereof will contain fewer letters than the number employed in the system. For instance, the name, Doe, John, in a five letter system, in such a case employ the zero to fill up the number, thus the name Doe, J., being represented as 49300—8 or 49300—80 or 4—9—300, according to the classification system employed.

The invention in question will be found extremely useful in eliminating a large part of the work necessary in making entries for bookkeeping in large department stores, in keeping records of auto licenses, tax records, records of patentees, records of mortgages, deeds, and any and all other record systems involving a large number of names.

By the use of this system and to the extent it may be adopted, each person may have one immutable specific number which will be the number of his insurance policy, automobile license, telephone, his record in stores and commercial houses, and in every other activity in which he is recorded.

I claim

1. An indexing element bearing numerical digits between 1 and 9 inclusive, each of a plurality of a selected number of the letters forming the name indexed being represented by a single digit between 1 and 9, inclusive.

2. An indexing element bearing digits between 1 and 9, inclusive, each of a plurality of a selected number of the letters forming the name indexed being represented by a single digit between 1 and 9, inclusive, and said digits being grouped to correspond to filing units.

In witness whereof, I hereunto subscribe my name to this specification in the presence of two witnesses.

ALAN ROBB FERGUSSON.

Witnesses:
A. B. CARROLL,
GRACE E. MARKS.